United States Patent
King et al.

(10) Patent No.: US 11,658,530 B2
(45) Date of Patent: May 23, 2023

(54) MODULAR BRUSHLESS DC (BLDC) MOTOR CONSTRUCTION

(71) Applicant: Stoneridge, Inc., Novi, MI (US)

(72) Inventors: Yulanda King, Amherst, NY (US); Jihcheng Lin, Novi, MI (US)

(73) Assignee: Stoneridge, Inc., Novi, MI (US)

( * ) Notice: Subject to any disclaimer, the term of this patent is extended or adjusted under 35 U.S.C. 154(b) by 83 days.

(21) Appl. No.: 17/376,228

(22) Filed: Jul. 15, 2021

(65) Prior Publication Data

US 2023/0019247 A1 Jan. 19, 2023

(51) Int. Cl.
*H02K 1/27* (2022.01)
*H02K 1/2793* (2022.01)
*H02K 3/28* (2006.01)
*H02K 37/12* (2006.01)
*H02K 5/173* (2006.01)
*H02K 7/08* (2006.01)
*H02K 1/16* (2006.01)

(52) U.S. Cl.
CPC .......... *H02K 1/2793* (2013.01); *H02K 1/165* (2013.01); *H02K 3/28* (2013.01); *H02K 5/1735* (2013.01); *H02K 7/083* (2013.01); *H02K 37/125* (2013.01)

(58) Field of Classification Search
CPC ........ H02K 1/2793; H02K 1/165; H02K 3/28; H02K 5/1735; H02K 7/083; H02K 37/125
USPC .................................................. 310/71, 268
See application file for complete search history.

(56) References Cited

U.S. PATENT DOCUMENTS

| 5,742,450 A | 4/1998 | Moser |
| 5,874,796 A | 2/1999 | Petersen |
| 5,982,058 A | 11/1999 | Bustamante et al. |

(Continued)

FOREIGN PATENT DOCUMENTS

| CH | 699082 | 1/2010 |
| CN | 201610163455 | 6/2016 |

(Continued)

OTHER PUBLICATIONS

Hitachi Develops Higher-Efficiency Motor Technology Using Amorphous Magnetic Metal from Subsidiary MetGlas, Magnetics Magazine, retrieved from https://magneticsmag.com/hitachi-develops-higher-efficiency-motor-technology-using-amorphous-magnetic-metal-from-subsidiary-metglas/ on Jul. 14, 2021.

(Continued)

*Primary Examiner* — Terrance L Kenerly
(74) *Attorney, Agent, or Firm* — Carlson, Gaskey & Olds, P.C.

(57) ABSTRACT

A brushless DC motor (BLDC) includes a stator having a ring-shaped body with multiple stator posts extending axially outward from the ring-shaped body. A plurality of stator windings are each wound about a corresponding one of the stator posts. A rotor support structure is positioned radially inward of the multiple stator posts. A rotor including a shaft is received in the rotor support structure. A first rotor disk is fixed to a first end of the shaft. At least a first set of magnets is disposed about the rotor disk and positioned radially adjacent to the stator posts such that the first set of magnets and the stator windings define a first radial flux flowpath. A second set of magnets positioned relative to the stator posts in one of an axial adjacency or a radial adjacency such that a second flux flowpath is defined.

18 Claims, 7 Drawing Sheets

(56) References Cited

U.S. PATENT DOCUMENTS

| | | |
|---|---|---|
| 6,198,182 B1 | 3/2001 | Bustamante et al. |
| 6,404,086 B1 | 6/2002 | Fukasaku et al. |
| D663,268 S | 7/2012 | Andrieux |
| 8,890,380 B2 | 11/2014 | Andrieux et al. |
| 10,148,152 B2 | 12/2018 | King et al. |
| 10,454,403 B2 | 10/2019 | King et al. |
| 10,658,902 B2 | 5/2020 | King et al. |
| 10,784,601 B2 | 9/2020 | Andrieux et al. |
| 2006/0113856 A1 | 6/2006 | Tanno et al. |
| 2008/0191562 A1 | 8/2008 | Kojima et al. |
| 2010/0060092 A1 | 3/2010 | Blakesley et al. |
| 2011/0027583 A1 | 2/2011 | Lee et al. |
| 2012/0036696 A1* | 2/2012 | Murakami ............ H02K 15/03 29/426.2 |
| 2012/0319512 A1* | 12/2012 | Nakagawa ............ H02K 1/278 310/71 |
| 2015/0004870 A1 | 1/2015 | Haughey et al. |
| 2016/0294228 A1 | 10/2016 | Dexet et al. |
| 2017/0366053 A1 | 12/2017 | Ash |
| 2019/0055109 A1 | 2/2019 | Korhonen et al. |
| 2019/0097494 A1 | 3/2019 | King et al. |
| 2020/0025940 A1 | 1/2020 | Nogues-Correig |

FOREIGN PATENT DOCUMENTS

| | | |
|---|---|---|
| CN | 201611160551 | 6/2018 |
| CN | 109067035 | 12/2018 |
| CN | 110311525 A | 10/2019 |
| CN | 209608493 | 11/2019 |
| CN | 110829643 | 2/2020 |
| EP | 1017151 | 7/2000 |
| EP | 1026809 A2 | 8/2000 |
| EP | 1729396 A1 | 12/2006 |
| EP | 1835599 A1 | 9/2007 |
| EP | 3651325 A1 | 5/2020 |
| JP | H04304156 | 10/1992 |
| JP | 2000253635 A | 9/2000 |
| JP | 2002044889 | 2/2002 |
| JP | 2005051929 A | 2/2005 |
| JP | 2015226334 A | 12/2015 |
| JP | 2018029423 A | 2/2018 |
| JP | 2020171134 | 10/2020 |
| KR | 1020120104829 | 9/2012 |
| WO | 9966624 | 12/1999 |
| WO | 2015173734 | 11/2015 |
| WO | 2019064630 | 4/2019 |
| WO | 2019176234 | 9/2019 |
| WO | 2020017133 | 1/2020 |
| WO | 2020065088 | 4/2020 |

OTHER PUBLICATIONS

Enomoto, Yiji, Development of Motor with Amorphous Metal, Hitachi, Center for Technology Innovation—Materials/Electrification Component & Material Research, retrieved from https://www.hitachi.com/rd/sc/story/amorphous/index.html on Jul. 14, 2021.

Smart BLDC Motor, Sonceboz, retrieved from https://www.sonceboz.com/smart-bldc on Jul. 14, 2021.

Smart BLDC Actuator Catalog, Sonceboz, retrieved from https://pdf.directindustry.com/pdf/sonceboz/smart-bldc-actuator-5810/14206-588568.html on Jul. 14, 2021.

International Search Report and Written Opinion for International Patent Application No. PCT/US2022/036175 completed on Oct. 14, 2022.

* cited by examiner

MODULAR BRUSHLESS DC (BLDC) MOTOR CONSTRUCTION

TECHNICAL FIELD

The present disclosure relates generally to Brushless DC (BLDC) motor construction, and more specifically to an improved configuration for BLDC motors.

BACKGROUND

Brushless DC (BLDC) Motors are synchronous motors that use a direct current (DC) electric power supply to drive rotation. The motors use an associated electronic closed loop controller to produce several alternating current (AC) signals driven over separate magnetic windings of the motor. The AC signals produce a rotating magnetic flux field. A rotor structure including magnets is positioned within the rotating magnetic flux field, and the interaction between the magnets and the rotating magnetic flux field drives the rotor to rotate. The rotation is output from the BLDC motor via a mechanical shaft and can be connected to any rotational system via conventional mechanical connections.

While electrically suited for a large range of applications, the physical constraints of a BLDC structure meeting the electrical requirements for certain applications are too large and/or have other dimensional reasons why they cannot be used. Improvements in both form factor and compactness of BLDC motors are desirable.

SUMMARY OF THE INVENTION

In one exemplary embodiment a brushless DC motor (BLDC) includes a stator having a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts, a rotor including a shaft received in the rotor support structure, a first rotor disk fixed to a first end of the shaft, at least a first set of magnets disposed about the rotor disk and positioned radially adjacent to the stator posts such that the first set of magnets and the stator windings define a first radial flux flowpath, and a second set of magnets positioned relative to the stator posts in one of an axial adjacency or a radial adjacency such that a second flux flowpath is defined.

In another example of the above described brushless DC motor the rotor support structure comprises an elongate bushing having a plurality of bearings disposed therein, each of the bearings in the plurality of bearings being configured to at least partially support the rotor shaft.

In another example of any of the above described brushless DC motors each bearing in the plurality of bearings includes an inner ring press-fit to the shaft and an outer ring contacting the bushing, the bushing being crimped at a location on an axial aligned surface where the outer ring of the first bearing contacts the busing and at a location on an axial aligned surface where the outer ring of the second bearing contacts the bushing.

In another example of any of the above described brushless DC motors each of the stator windings is connected via a conductive ring forming a wye phase connection having a neutral node, the conductive ring being fully enclosed.

In another example of any of the above described brushless DC motors the conductive ring defines the neutral node, and wherein the neutral node maintains a neutral node connection to all stator windings in the event of an open circuit fault on the conductive ring.

In another example of any of the above described brushless DC motors the conductive ring includes an expanding portion configured to provide a circumferential break during assembly of the brushless DC motor.

In another example of any of the above described brushless DC motors pressure from surrounding component of the brushless DC motor maintains a physical contact across the expanding portion.

In another example of any of the above described brushless DC motors second set of magnets is fixed to the rotor disk.

In another example of any of the above described brushless DC motors the second set of magnets are fixed to an axially extending portion of the rotor disk and are disposed radially inward of the stator posts such that the second set of magnets defines a radial flux flowpath.

In another example of any of the above described brushless DC motors the second set of magnets are fixed to an axially facing surface of the rotor disk and are disposed at an axial end of the stator posts such that the second set of magnets defines an axial flux flowpath.

In another example of any of the above described brushless DC motors each of the stator posts includes at least one geometric feature selected from the list of tapered sides, axially intruding slots, and axially intruding divots.

Another example of any of the above described brushless DC motors further includes a first non-conductive ring disposed at a first axial end of the brushless DC motor and a second non-conductive ring disposed at a second axial end of the brushless DC motor.

In another example of any of the above described brushless DC motors at least one of the non-conductive rings includes a mounting support configured to structurally support the brushless DC motor relative to a housing.

In another example of any of the above described brushless DC motors the rotor further includes a second rotor disk fixed to the shaft at an axial end of the stator opposite the axial end of the shaft, the second rotor including a rotor disk, and wherein at least the second set of magnets are fixed to the rotor disk.

In one exemplary embodiment a brushless DC motor (BLDC) includes a stator having a ring-shaped body having multiple stator posts extending axially outward form the ring-shaped body, a plurality of stator windings wherein each of the stator windings is wound about a corresponding one of the stator posts, and a rotor support structure positioned radially inward of the multiple stator posts, a rotor including a shaft received in the rotor support structure, a first rotor disk fixed to a first end of the shaft, at least a first set of magnets disposed about the rotor disk and positioned adjacent the stator posts such that one of an axial flux flowpath and a radial flux flowpath is formed between the first set of magnets and the stator windings, and the rotor including a second rotor disk fixed to the shaft at an axial end of the stator opposite the axial end of the shaft, the second rotor including at least a second set of magnets disposed about the rotor disk and adjacent the stator posts such that one of an axial flux flowpath and a radial flux flowpath is formed between the magnets and the stator windings.

In another example of the above described brushless DC motor each of the stator windings is connected via a conductive ring forming a wye phase connection having a neutral node, the conductive ring being fully enclosed.

In another example of any of the above described brushless DC motors the first set of magnets and the second set of magnets define an axial flux flowpath.

Another example of any of the above described brushless DC motors further includes a first non-conductive ring disposed at a first axial end of the brushless DC motor and a second non-conductive ring disposed at a second axial end of the brushless DC motor, at least one of the non-conductive rings includes a mounting support configured to structurally support the brushless DC motor relative to a housing.

These and other features of the present invention can be best understood from the following specification and drawings, the following of which is a brief description.

DETAILED DESCRIPTION

Figure 1:
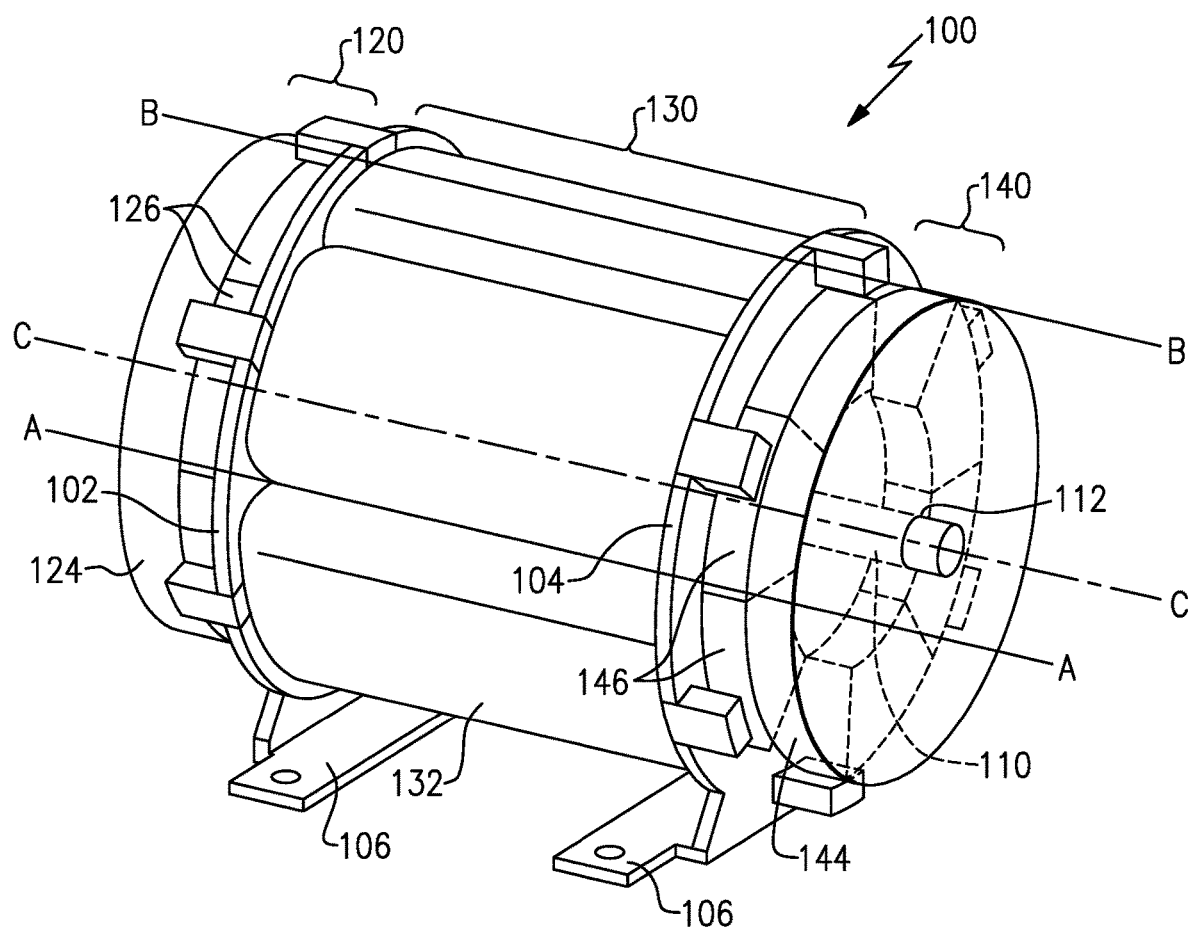
FIG. 1 schematically illustrates a dual rotor brushless DC (BLDC) motor.
Figure 2:
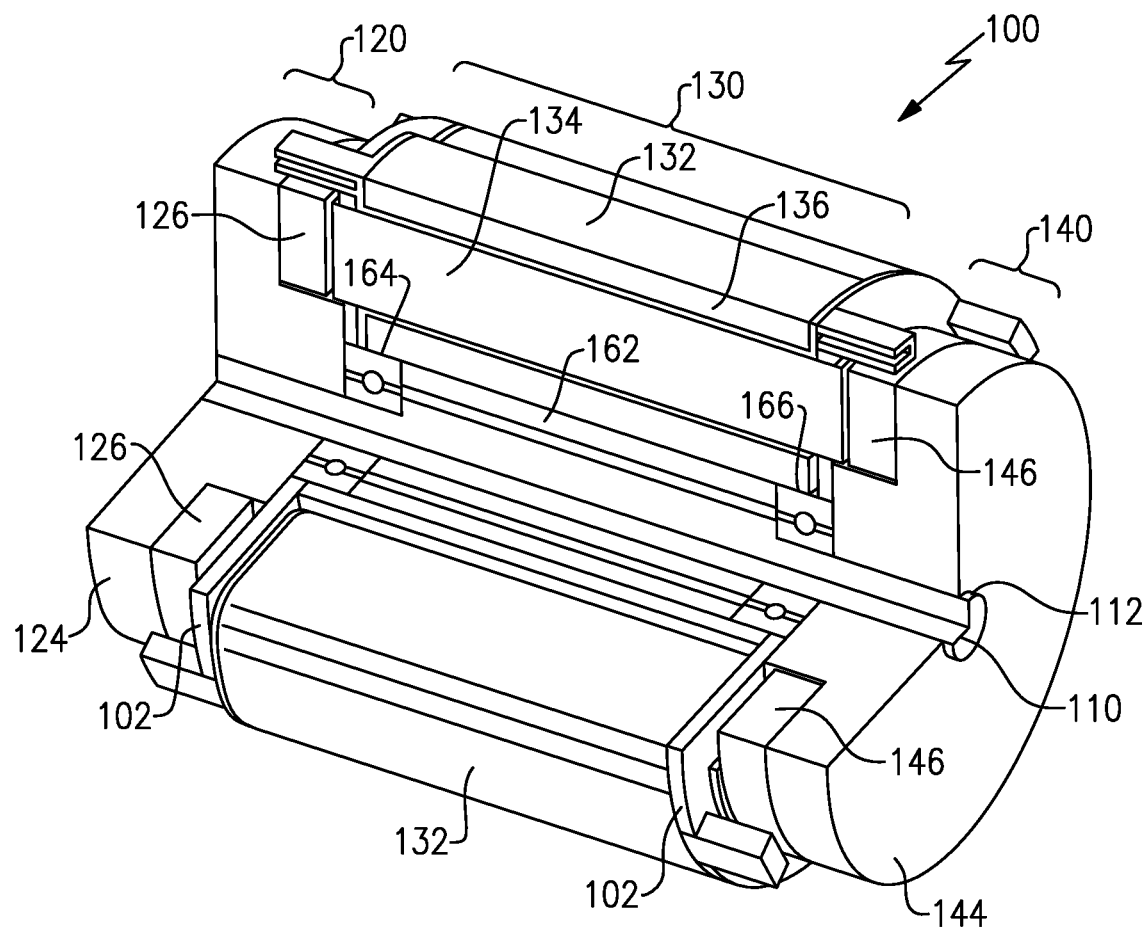
FIG. 2 schematically illustrates a quarter sectional view of the dual rotor BLDC of FIG. 1 with sectional lines A, B defining the removed quarter.
Figure 3:
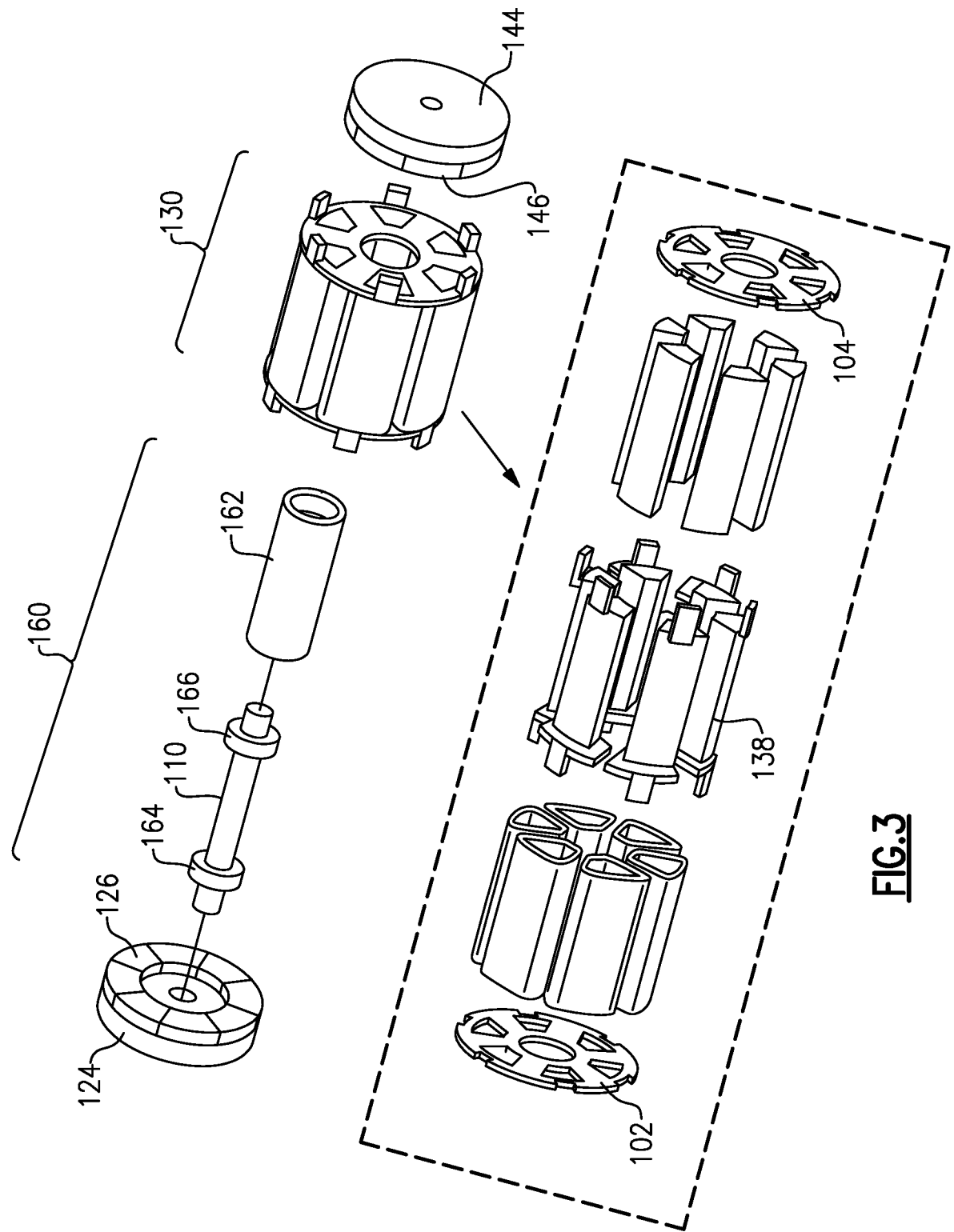
FIG. 3 schematically illustrates an exploded view of the BLDC motor of FIGS. 1 and 2.

FIGS. 1-3 schematically illustrate a Brushless DC (BLDC) motor 100 with FIG. 1 providing an isometric view of a dual rotor axial flux BLDC motor 100, FIG. 2 schematically a quarter sectional isometric view of the BLDC motor 100 cut along cross-sectional lines A and B, and FIG. 3 schematically illustrating an exploded view of the BLDC motor 100. The BLDC motor 100 defines an axial flux flowpath by positioning a first rotor section 120 with magnets 126 axially adjacent to stator windings 132 and positioning a second rotor section 140 with magnets 146 axially adjacent the stator windings 132 at the axially opposite end of the stator section 130. In alternate configurations, the rotor section 140 can be modified to provide a radial flux path by positioning the sets of magnets 126, 146 radially adjacent to the stator posts and including a portion of the rotor disk radially adjacent to the sets of magnets 126, 146, with the magnets 126, 146 being disposed between the rotor disk and the stator post.

Each rotor section 120, 140 includes a solid rotor disk 124, 144 (illustrated transparent at one axial end for explanatory purposes.) Attached to an inward facing surface of each rotor disk 124, 144 is a corresponding set of permanent magnets 126, 146. The set of permanent magnets 126, 146 includes an even number of magnets arranged circumferentially such that the magnetic poles alternate in a N-S configuration. The permanent magnets 126, 146 are maintained axially adjacent stator windings 132 within the stator 130, thereby defining an axial flux flowpath during operation of the BLDC motor 100. Each of the stator windings 132 is constructed of a solid core stator post 134 with an electrically conductive coil winding 136 wrapped around the stator post 134. Each of the coil windings 136 is connected at an input to a power source according to any known BLDC power switching system. In addition, each of the coil windings 136 is connected to each other coil winding 136 at one end via a short circuit ring (see FIG. 6C) creating a wye shaped connection.

By providing power to the windings according to conventional BLDC switching, a rotating flux field is generated and passed to the axially adjacent permanent magnets. The flux field drives the permanent magnets 126, 146 to rotate, which drives rotation of the shaft 110. The shaft 110 provides an output to any systems that require rotational energy.

The rotor sections 120, 140 are supported relative to the stator section 130 via a rotor support structure 160. In the example of FIG. 1, the rotor support structure 160 includes an elongate bushing 162 extending axially and receiving the rotor shaft 110. A pair of bearings 164, 166 (illustrated in FIG. 2) maintain the shaft 110 in position relative to the elongate bushing, and the bushing is press fit into the stator. The shaft 110 is fixedly connected to the rotor disc 124, 144 at each axial end of the BLDC 100. This configuration prevents axial movement of the rotor shaft 110 after the BLDC motor 100 is assembled, while still allowing the rotor shaft 110 to rotate freely within the bushing 162.

In the illustrated example of FIG. 1, a pair of non-conductive rings 102, 104 are mounted to the stator portion with one at each axial end along the axis C. In one example, the non-conductive rings 102, 104 are constructed of aluminum although alternative materials can be utilized to similar effect. The rings 102, 104 are positioned between the magnets 126, 146 and the stator windings 136 and are interfaced with a stator bobbin 138 that maintains the relative positions of each of the stator windings 132 within the stator portion 130. Due to their non-conductive nature, the rings 102, 104 do not interfere with the conversion of electrical energy through the stator windings to rotational energy at the rotor sections 120, 140. The illustrated rings 102, 104 of FIG. 1 include mounting features 106 that allow the motor 100 to be mounted to a structure within a housing, or to a structure in which the motor 100 is being used. In the case that the motor 100 will be incorporated in an overmold housing directly (e.g., the example of FIGS. 2 and 3), the mounting features 106 can be omitted from the rings 102, 104. In yet further embodiments, the aluminum rings can be omitted from the structure entirely where no structural support of the BLDC motor 100 is required.

The dual rotor BLDC motor 100 of FIGS. 1-3 utilizes a rotor support structure including an elongate bushing 162 having multiple bearings 164, 166 included within the elongate bushing 162. The bearings 164, 166 each at least partially support the shaft 110 and maintain the relative positions of the shaft 110 and the rotor sections 120, 140. In one example, the inner rings of the bearings 164, 166 are press-fit on the shaft 110 and the outer rings of each bearing 164, 166 are light push-fit with the bushing 162. The end sides of the bushings 162 are crimped, creating dents, or other similar features protruding from the end side toward the corresponding bearing 164, 166. The outer ring of each bearing 164, 166 contacts the protruding features resulting from the crimping and the friction prevents the two bearings 164, 166 from rotating in the bushing housing. The lack of rotation with the bushing housing helps prevent bearing lubrication from drying out during operation of the BLDC motor, thereby extending the life of the BLDC motor. After inserting the bushing 162, the bearings 164, 166 and shaft into the stator and forming the dents for crimping, the two rotor/magnet subassemblies are installed. Although, alternate examples can include a crimp on an alternate bearing 164, 166 or on both bearings 164, 166. The alternate examples illustrated in FIG. 4, can function equally well in the embodiment of FIGS. 1-3 and vice versa.

Figure 4A:
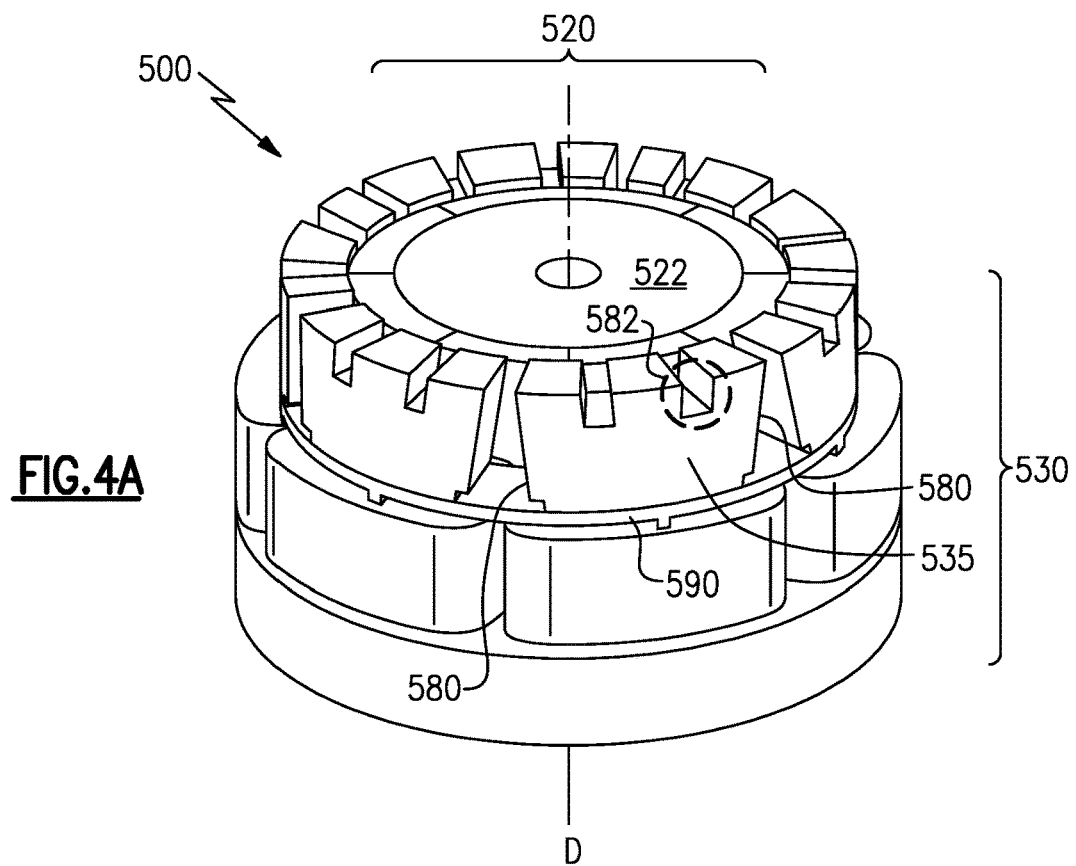
FIG. 4A isometrically illustrates a single rotor brushless DC (BLDC) motor with a portion omitted for feature clarity.
Figure 4B:
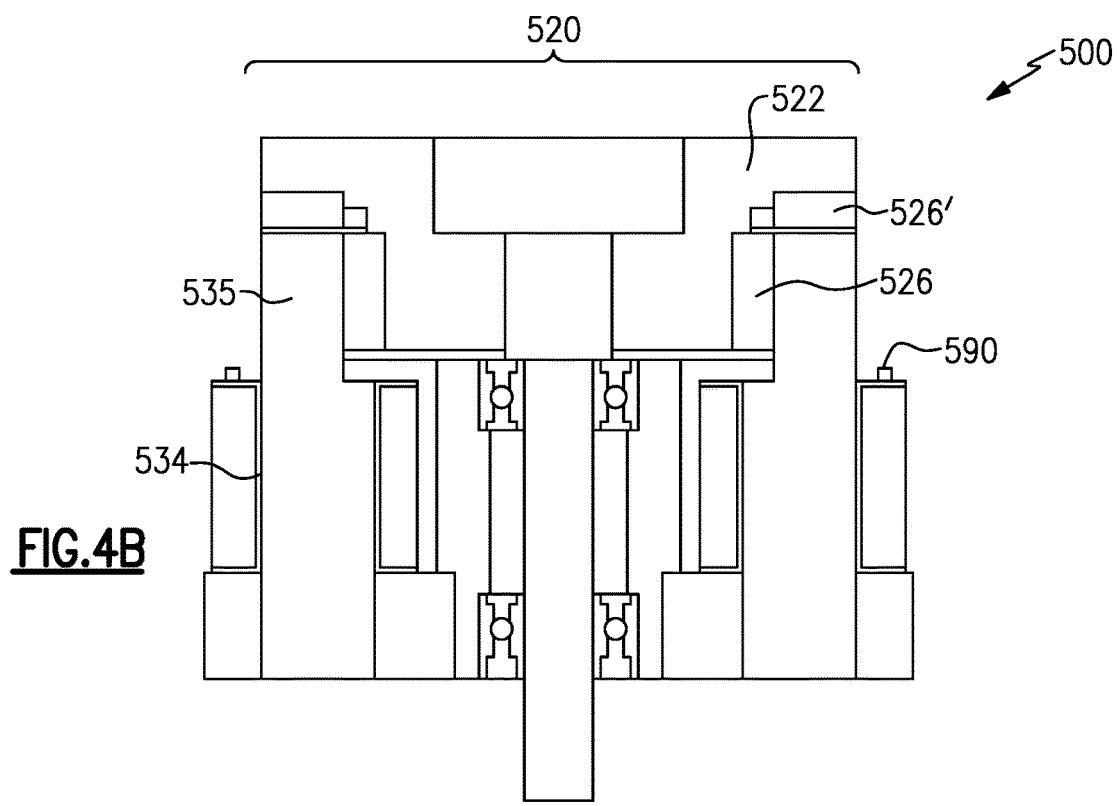
FIG. 4B schematically illustrates a cross section of the single rotor BLDC motor of FIG. 4A including the portions of the rotor omitted from FIG. 4A.
Figures 4C, 4D:
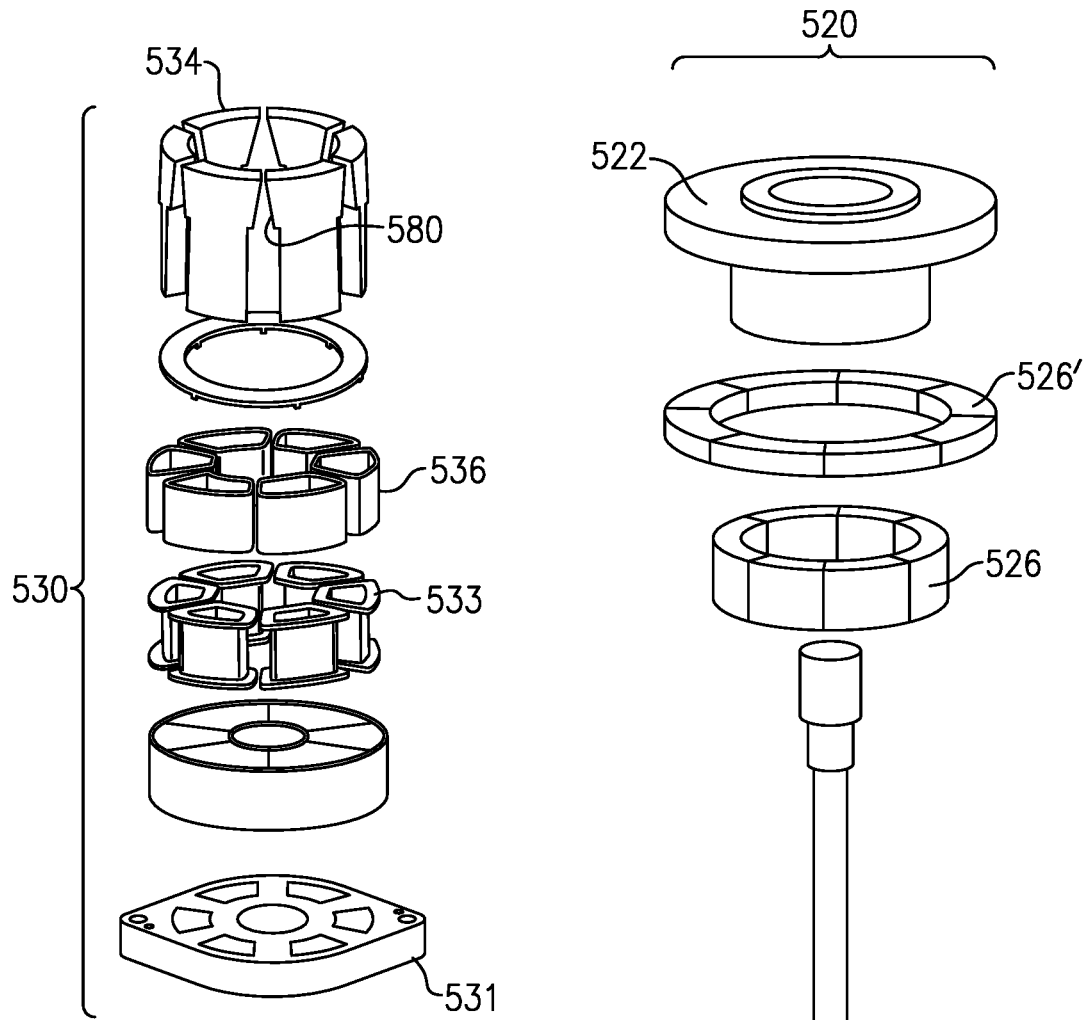
FIG. 4C schematically illustrates an exploded view of the stator section of the single rotor BLDC motor of FIG. 4A.
FIG. 4D schematically illustrates an exploded view of the rotor section of the single rotor BLDC motor of FIG. 4A including the portions of the rotor omitted from FIG. 4A.

With continued reference to FIGS. 1-3, and with like numerals indicating like elements, FIGS. 4A, 4B, 4C, and 4D schematically illustrate a brushless DC (BLDC) motor 500 that is able to achieve at least a portion of the benefits of the dual rotor configuration by including multiple sets of magnets on a single rotor. FIG. 4A illustrates an isometric view of the BLDC 500, with a portion of the rotor section 520 omitted for enhanced visibility of the stator portions 520. FIG. 4B illustrates a cross section of the BLDC motor 500 with the portions omitted from FIG. 4B present. FIG. 4C illustrates an exploded view of the stator portion 530 of the motor 500. FIG. 4D illustrates an exploded view of the rotor section 520 of the motor 500.

The BLDC 500 is configured with a single rotor portion 520 including a rotor disk 522. Mounted on a radially outward edge of the rotor disk 522 are the set of permanent magnets 526. The permanent magnets 526 are radially inward of a portion 535 of each stator post 534 in the stator portion 530, thereby creating a radially aligned flux flowpath. The stator portion 530 includes a baseplate 531 with the stator posts 534 protruding axially from the base plat 531. Each of the stator posts is contained within a bobbin 533 and the coil windings 536 are wound around the bobbins 533. An overmold structure 535 surrounds and supports the windings 536 and bobbins 533.

As shown in FIGS. 4B and 4D, and omitted from FIG. 4A, the rotor disk 522 extends axially above the stator post 534, and a second set of magnets 526' is positioned axially adjacent the stator post 534. In alternate examples of the single rotor BLDC 500, such as the example illustrated in FIG. 5, the rotor disk 522 can be axially beyond the stator posts and include structures for supporting a first set of permanent magnets radially outward of the stator posts and a second set of permanent magnets axially beyond the stator posts. In both cases, the configuration results in a hybrid axial-radial flux motor.

Due to the interaction between the permanent magnets and the stators of the BLDC 500, a cogging torque is generated during operation of the BLDC motor 500. Cogging torque is generally undesirable, and is especially prominent at lower speeds, where it and can result in jerkiness and speed ripple. Included within each of the portions 535 of the stator posts 530 extending beyond the winding are multiple shaping features 580, 582. The shaping features 580, 582 include angled edges 580 and axial slots 582. Each of the shaping features 580, 582 operates to tune the cogging torque generated during operation of the BLDC 500, thereby reducing the total cogging torque that occurs during operation of the BLDC motor 500. The tuning of the cogging torque of each feature 580, 582 is depending on the shape and orientation of the feature.

By way of example, the cogging torque tuning resulting from the slots 582 can be adjusted by changing the depth of the slots, the number of the slots, and the angle of the slots relative to the axis D of the BLDC 500. In one particular example, the cogging torque is beneficially tuned by ensuring that the slots are skew relative to the axis, meaning that a line formed by the slots 582 do not cross through the axis D.

In another example, the cogging torque tuning provided by the tapered edges of the stator slot portions 535 extending beyond the windings 536, with the magnitude of the tuning being depending on the angle of the tapering. In yet further modifications, the tapering can be a varying angle, resulting in a curved shape, with the rate of change of the taper angle impacting the tuning amount for the cogging torque.

In another example, such as the example of FIG. 1, where the stator post does not extend axially beyond the windings, the cogging torque may be tuned by including pockets, or divots, in the axial facing end of the stator post. The divots take the form of intrusions into the end of the stator post, with the particular shape, depth, and size of the intrusion impacting the tuning of the cogging torque.

The particular goal of tuning for a given application will determine the particular shape and amount of the cogging torque tuning features 580, 582. One of skill in the art, having the benefit of this disclosure will be able to determine the appropriate form without substantial experimentation. In addition, the cogging torque tuning features 580, 582 can be equally applied at each end of the dual rotor BLDC 100 of FIGS. 1-3.

Figure 5A:
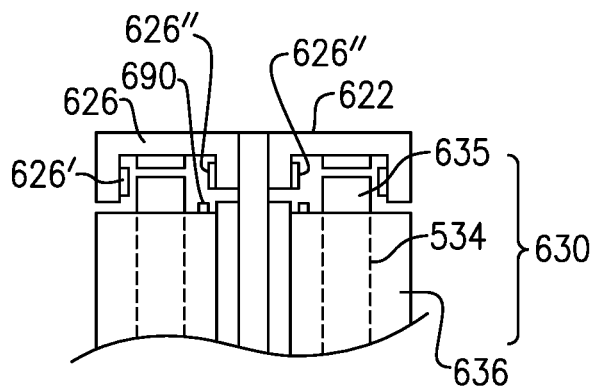
FIG. 5A schematically illustrates a cross section of a single rotor BLDC motor with two radially aligned sets of magnets and an axially aligned set of magnets.
Figure 5B:
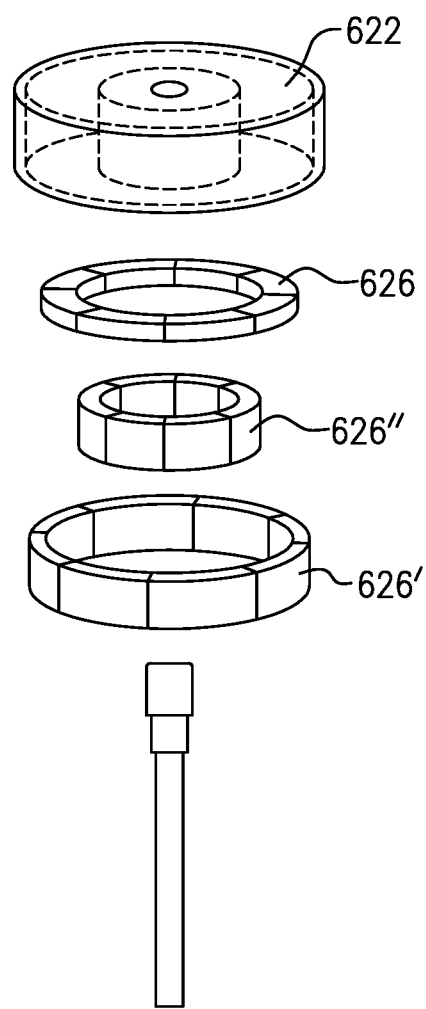
FIG. 5B illustrates an exploded view of the rotor section for FIG. 5A.

With continued reference to FIG. 5, and with like numerals indicating like elements, FIG. 5A schematically illustrates a cross sectional view of a partial single rotor BLDC motor 600 similar to the single rotor BLDC 500 of FIG. 4 and FIG. 5B illustrates an exploded view of the rotor portion 620 of FIG. 5A. While illustrated in a schematic block form, it is appreciated that the stator portion 630 of the BLDC 600 of FIG. 5 is substantially identical to the stator portion 530 of FIG. 4. Unlike the example of FIG. 4, the BLDC of FIG. 5 includes two sets of permanent magnets 626, 626' with the first set 626 being fixedly attached to the rotor disk 622 axially adjacent to the portion 635 of the stator posts 634 extending beyond the windings 636. The second set of magnets 626' are connected to an overhang portion of the rotor disk 622 and are maintained radially outward of the stator portion 635. In addition a third radially aligned magnet set 626" is mounted to the rotor disk radially inward of the stator posts 635. This configuration results in a hybrid radial axial flux BLDC using a single rotor section 620 having multiple magnet sets 626, 626', 626". In alternate examples one of the magnet sets 626, 626', 626" can be omitted to utilize two rotor sets.

Figure 6A:
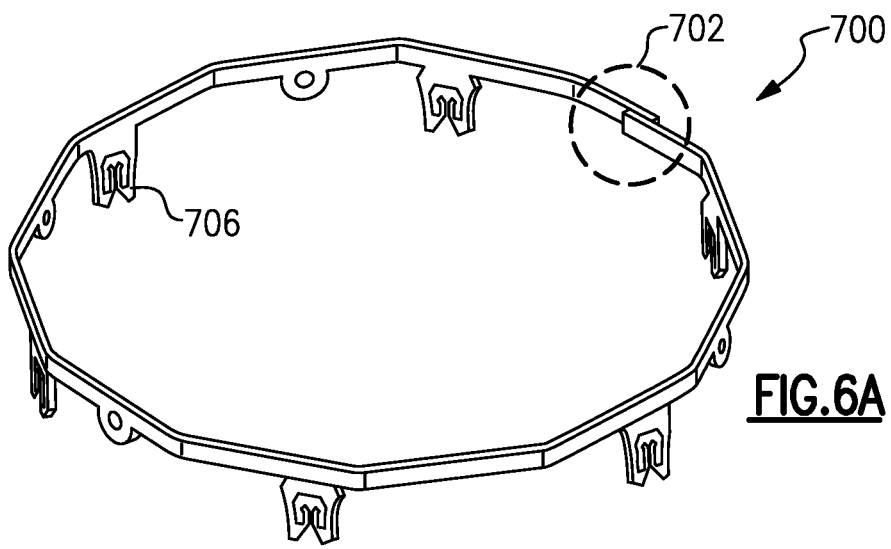
FIG. 6A Schematically illustrates a short circuit ring for use in any of the BLDCs of FIGS. 1-5B.
Figure 6B:
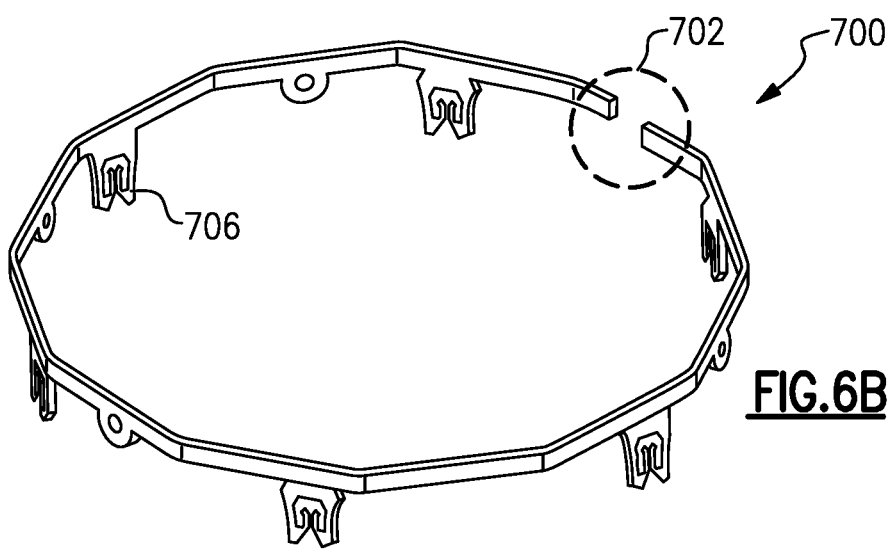
FIG. 6B schematically illustrates the short circuit ring of FIG. 6A expanded for installation.

In order to properly function, each of the BLDC's 100, 500, 600 described above connects the stator winding coils in a wye shaped arrangement using a short circuit ring 590, 690 (illustrated in FIGS. 4A, 4B and 5). With continued reference to FIGS. 1-5B, FIGS. 6A and 6B illustrate the example short circuit ring 700 for connecting one end of each winding to each other winding and thereby enabling the BLDC operations with an expanding portion 702 open for installation. In some alternate examples, the example short circuit ring 700 of FIG. 6A is a permanently closed ring, and remains closed during assembly of the BLDC 100, 400, 500, 600 incorporating the short circuit ring. In the illustrated example, the short circuit ring 700 includes an opening 702 that can be flexed open circumferentially during installation. Once the short circuit ring is positioned in the correct location, a spring force in the short circuit ring returns the ring to the closed position with a radially outward facing surface of one portion of the expansion contacting a radially inward facing surface of another portion of the expansion, thereby ensuring an electrical connection across the expansion. In a practical example, once the BLDC motor is fully assembled, the other components of the BLDC motor will exert a radial pressure on the expanding portion 702, ensuring that the electrical contact is maintained.

Figure 6C:
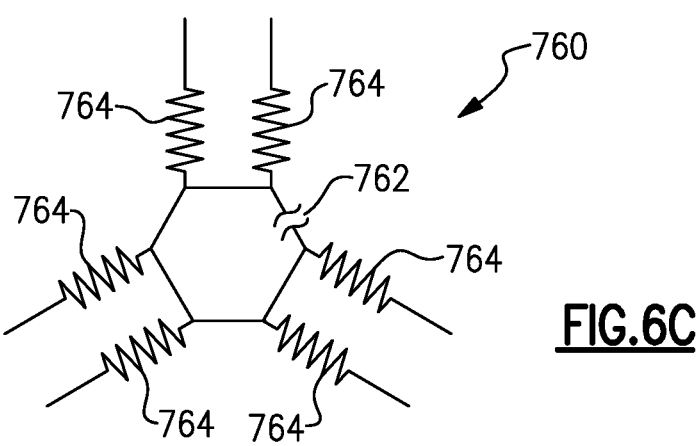
FIG. 6C schematically illustrates an electrical circuit constructed by the short circuit rings of FIGS. 6A and 6B.

The short circuit ring 700 is a conductive ring that forms a neutral node of the wye phase connection. The ring 700 includes connection clips 706 with each clip being able to connect to a corresponding stator winding. The short circuit ring 700 provides a complete loop electrical connection connecting each of the stator windings of the BLDC motor. The electrical circuit 760 created by the usage of the short circuit ring 700 is illustrated in FIG. 6C with an open circuit fault 762 present on the circuit 760. The complete loop is referred to herein as the conductive ring being "fully enclosed".

The use of a complete loop stator ring allows the conductive ring to maintain a neutral node connection to all the stator windings 764 in the event of a single open circuit fault. When a single open circuit fault 762 occurs, the BLDC motor is able to continue operating in its normal operations. When a second fault occurs, one or more of the stator windings 764 is electrically removed (open) due to the pair of faults. The second fault is detected using conventional fault detection schemes, and the operations of the BLDC motor can be wound down to prevent further damage. The closed ring configuration provides a redundancy that allows the BLDC motor to continue operating at full capacity even after a fault has occurred.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A brushless DC motor (BLDC) comprising:
   a stator including a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts;
   a rotor including a shaft received in the rotor support structure, a first rotor disk fixed to a first end of the shaft, at least a first set of magnets disposed in a first ring about the rotor disk and positioned radially adjacent to the stator posts such that the first set of magnets and the stator windings define a first radial flux flowpath; and
   a second set of magnets disposed in a second ring and positioned relative to the stator posts in one of an axial adjacency or a radial adjacency such that a second flux flowpath is defined, the second ring being distinct from the first ring.

2. The brushless DC motor of claim 1, wherein the rotor support structure comprises an elongate bushing having a plurality of bearings disposed therein, each of the bearings in the plurality of bearings being configured to at least partially support the rotor shaft.

3. The brushless DC motor of claim 2, wherein each bearing in the plurality of bearings includes an inner ring press-fit to the shaft and an outer ring contacting the bushing, the bushing being crimped at a location on an axial aligned surface where the outer ring of the first bearing contacts the busing and at a location on an axial aligned surface where the outer ring of the second bearing contacts the bushing.

4. The brushless DC motor of claim 1, wherein each of the stator windings is connected via a conductive ring forming a wye phase connection having a neutral node, the conductive ring being fully enclosed.

5. A brushless DC motor (BLDC) comprising:
   a stator including a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts, each of the stator windings is connected via a fully enclosed conductive ring forming a wye phase connection having a neutral node, wherein the conductive ring defines the neutral node, and wherein the neutral node maintains a neutral node connection to all stator windings in the event of an open circuit fault on the conductive ring;
   a rotor including a shaft received in the rotor support structure, a first rotor disk fixed to a first end of the shaft, at least a first set of magnets disposed about the rotor disk and positioned radially adjacent to the stator posts such that the first set of magnets and the stator windings define a first radial flux flowpath; and
   a second set of magnets positioned relative to the stator posts in one of an axial adjacency or a radial adjacency such that a second flux flowpath is defined.

6. A brushless DC motor (BLDC) comprising:
   a stator including a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts, each of the stator windings is connected via a fully enclosed conductive ring forming a wye phase connection having a neutral node, wherein the conductive ring includes an expanding portion configured to provide a circumferential break during assembly of the brushless DC motor;
   a rotor including a shaft received in the rotor support structure, a first rotor disk fixed to a first end of the shaft, at least a first set of magnets disposed about the rotor disk and positioned radially adjacent to the stator posts such that the first set of magnets and the stator windings define a first radial flux flowpath; and
   a second set of magnets positioned relative to the stator posts in one of an axial adjacency or a radial adjacency such that a second flux flowpath is defined.

7. The brushless DC motor of claim 6, wherein pressure from surrounding component of the brushless DC motor maintains a physical contact across the expanding portion.

8. The brushless DC motor of claim 1, wherein second set of magnets is fixed to the rotor disk.

9. The brushless DC motor of claim 8, wherein the second set of magnets are fixed to an axially extending portion of the rotor disk and are disposed radially inward of the stator posts such that the second set of magnets defines a radial flux flowpath.

10. A brushless DC motor (BLDC) comprising:
a stator including a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts;
a rotor including a shaft received in the rotor support structure, a first rotor disk fixed to a first end of the shaft, at least a first set of magnets disposed about the rotor disk and positioned radially adjacent to the stator posts such that the first set of magnets and the stator windings define a first radial flux flowpath; and
a second set of magnets fixed to an axially facing surface of the rotor disk and are disposed at an axial end of the stator posts such that the second set of magnets defines an axial flux flowpath.

11. The brushless DC motor of claim 1, wherein each of the stator posts includes at least one geometric feature selected from the list of tapered sides, axially intruding slots, and axially intruding divots.

12. The brushless DC motor of claim 1, further comprising a first non-conductive ring disposed at a first axial end of the brushless DC motor and a second non-conductive ring disposed at a second axial end of the brushless DC motor.

13. The brushless DC motor of claim 12, wherein at least one of the non-conductive rings includes a mounting support configured to structurally support the brushless DC motor relative to a housing.

14. A brushless DC motor (BLDC) comprising:
a stator including a ring-shaped body having multiple stator posts extending axially outward from the ring-shaped body, a plurality of stator windings wherein each of the stator windings is wound about a corresponding one of the stator posts, and a rotor support structure positioned radially inward of the multiple stator posts;
a rotor including a shaft received in the rotor support structure, a first rotor disk fixed to a first end of the shaft, at least a first set of magnets disposed about the rotor disk and positioned radially adjacent to the stator posts such that the first set of magnets and the stator windings define a first radial flux flowpath;
a second set of magnets positioned relative to the stator posts in one of an axial adjacency or a radial adjacency such that a second flux flowpath is defined, the rotor further including a second rotor disk fixed to the shaft at an axial end of the stator opposite the axial end of the shaft, the second rotor including a rotor disk, and wherein at least the second set of magnets are fixed to the second rotor disk.

15. A brushless DC motor (BLDC) comprising:
a stator including a ring-shaped body having multiple stator posts extending axially outward form the ring-shaped body, a plurality of stator windings wherein each of the stator windings is wound about a corresponding one of the stator posts, and a rotor support structure positioned radially inward of the multiple stator posts;
a rotor including a shaft received in the rotor support structure, a first rotor disk fixed to a first end of the shaft, at least a first set of magnets disposed about the rotor disk and positioned adjacent the stator posts such that one of an axial flux flowpath and a radial flux flowpath is formed between the first set of magnets and the stator windings; and
the rotor including a second rotor disk fixed to the shaft at an axial end of the stator opposite the axial end of the shaft, the second rotor including at least a second set of magnets disposed about the rotor disk and adjacent the stator posts such that one of an axial flux flowpath and a radial flux flowpath is formed between the magnets and the stator windings.

16. The brushless DC motor of claim 15, wherein each of the stator windings is connected via a conductive ring forming a wye phase connection having a neutral node, the conductive ring being fully enclosed.

17. The brushless DC motor of claim 15, wherein the first set of magnets and the second set of magnets define an axial flux flowpath.

18. The brushless DC motor of claim 15, further comprising a first non-conductive ring disposed at a first axial end of the brushless DC motor and a second non-conductive ring disposed at a second axial end of the brushless DC motor, at least one of the non-conductive rings includes a mounting support configured to structurally support the brushless DC motor relative to a housing.

* * * * *